United States Patent [19]

Audeh

[11] Patent Number: 5,173,286
[45] Date of Patent: Dec. 22, 1992

[54] FIXATION OF ELEMENTAL MERCURY PRESENT IN SPENT MOLECULAR SIEVE DESICCANT FOR DISPOSAL

[75] Inventor: Costandi A. Audeh, Princeton, N.J.

[73] Assignee: Mobil Oil Corporation, Fairfax, Va.

[21] Appl. No.: 732,690

[22] Filed: Jul. 19, 1991

[51] Int. Cl.$^5$ .............................................. B09B 3/00
[52] U.S. Cl. ................................ 423/566.1; 423/592; 423/99; 423/210; 588/236; 588/256
[58] Field of Search .......... 423/210, 99, 101, DIG. 20, 423/566.1, 513, 659, 522, 592; 210/751, 758, 759; 588/236, 256

[56] References Cited

U.S. PATENT DOCUMENTS

| | | | |
|---|---|---|---|
| 3,516,947 | 6/1970 | Dudzik | 502/80 |
| 3,740,331 | 6/1973 | Anderson et al. | 210/726 |
| 3,790,370 | 2/1974 | Lalancette | 210/721 |
| 3,873,581 | 3/1975 | Fitzpatrick et al. | 210/688 |
| 4,070,300 | 1/1978 | Moroni et al. | 252/190 |
| 4,147,626 | 4/1979 | Findlay et al. | 423/101 |
| 4,233,274 | 11/1980 | Allgulin | 423/210 |
| 4,260,494 | 4/1981 | Dotson et al. | 423/184 |
| 4,333,913 | 6/1982 | Dotson et al. | 423/184 |
| 4,354,942 | 10/1982 | Kaczur et al. | 210/751 |
| 4,474,896 | 10/1984 | Chao | 502/216 |
| 4,534,944 | 8/1985 | Roydhouse | 423/210 |
| 4,591,490 | 5/1986 | Horton | 423/210 |
| 4,614,592 | 9/1986 | Googin et al. | 210/679 |
| 4,708,853 | 11/1987 | Matviya et al. | 423/210 |
| 4,731,187 | 3/1988 | Moriya et al. | 210/719 |
| 4,746,486 | 11/1988 | Audeh | 423/210 |
| 4,786,483 | 11/1988 | Audeh | 423/210 |
| 4,814,091 | 3/1989 | Napier et al. | 210/665 |
| 4,814,152 | 3/1989 | Yan | 423/210 |
| 4,834,953 | 5/1989 | Audeh | 423/210 |
| 4,844,815 | 7/1989 | Ader et al. | 210/914 |
| 4,874,525 | 10/1989 | Markovs | 423/210 |
| 4,877,515 | 10/1989 | Audeh | 423/230 |
| 4,880,527 | 11/1989 | Audeh | 210/702 |
| 4,985,389 | 1/1991 | Audeh | 502/407 |
| 4,986,896 | 1/1991 | Avidan et al. | 502/34 |

OTHER PUBLICATIONS

Conner, J. R. "Fixation and Solidification of Wastes", Chemical Engineering, Nov. 10, 1986, pp. 79–85.
Cotton, F. A., et al. "Advanced Inorganic Chemistry", 4th Ed. Wiley-Interscience:NY (1980), pp. 535 and 592.

*Primary Examiner*—Michael Lewis
*Assistant Examiner*—Peter T. DiMauro
*Attorney, Agent, or Firm*—Alexander J. McKillop; Charles J. Speciale

[57] ABSTRACT

A process for fixing elemental mercury (Hg°) in a spent molecular sieve desiccant is disclosed. The process includes isolating gspent molecular sieve desiccant containing elemental mercury, and contacting the spent desiccant in a dilute aqueous solution of an alkaline metal salt. The reaction traps the mercury within the spent desiccant as an insoluble heavy metal salt. The alkaline metal salt can include, for example, sodium thiosulfate ($Na_2S_2O_3$), sodium polysulfide ($Na_2S_x$), or potassium peroxomonosulfate ($KHSO_5$). The reaction with any of these aqueous solutions acts to fix the elemental mercury (Hg°) as a mercury compound within the solid desiccant. If sodium thiosulfate or sodium polysulfide is utilized, then the process also includes introducing hydrochloric acid (HCl) in a suitable quantity to liberate sufficient elemental sulfur to react with the elemental mercury (Hg°) to form an HgS salt. The formation of HgS fixes the elemental mercury (Hg°) in the form of a heavy metal salt in the solid desiccant. If, however, an aqueous potassium peroxomonosulfate ($KHSO_5$) solution is utilized, then HCl is not needed. The aqueous potassium peroxomonosulfate solution is used in a suitable concentration to convert the elemental mercury (Hg°) in the spent desiccant to HgO, so that the elemental mercury (Hg°) is fixed as an insoluble heavy metal oxide in the solid desiccant.

7 Claims, No Drawings

FIXATION OF ELEMENTAL MERCURY PRESENT IN SPENT MOLECULAR SIEVE DESICCANT FOR DISPOSAL

BACKGROUND OF THE INVENTION

1. Field of the Invention

This invention relates to the fixation of elemental mercury (Hg°) present in spent molecular sieve desiccants, which are used in the drying of hydrocarbon gases containing trace amounts of elemental mercury (Hg°), prior to disposal.

2. Background of the Related Art

Drying, or dehydration, is a chemical engineering operation that has extensive applications in plants in which gases, and specifically hydrocarbon gases are processed. For example, in a cryogenic gas liquefaction plant, in order to minimize the risk of plugging by the formation of ice, it is essential to reduce the moisture content of the gas feed to very low levels, about 1–5 ppm. This reduction in the moisture content is achieved by the use of desiccant beds. These beds usually contain molecular sieves which operate continuously and are regenerated in a cyclic manner. Desiccants or molecular sieves have a finite life and have to be replaced after their efficiency becomes reduced. When the desiccant becomes spent it is a waste product for which an avenue of disposal is required. Spent desiccants have been used in landfills, in road construction, and as aggregates in cement related construction projects. In the case of spent molecular sieve desiccants that contain heavy metal ions, however, fixing procedures that prevent the metal from leaching are necessary and must be applied before the spent molecular sieve desiccant is eliminated.

In the case of gases, such as hydrocarbon gases that usually contain elemental mercury ("Hg°"), the concentration of Hg° in the gas, which is carried into the desiccant bed is usually low. However, Hg° is a hazardous substance and even when low concentration of Hg° are present in the feed, sufficient Hg° is deposited on the spent desiccant to make normal landfill disposal environmentally unacceptable. In addition, the usual fixing procedures which have been devised for fixing metal ions are not generally applicable to Hg°.

A process for in situ stabilization of soluble mercury in deposits of mercury-containing materials is described in U.S. Pat. No. 4,354,942 to Kaczur et al. The method includes treating the deposits of mercury containing material with a stabilizing amount of an inorganic sulfur compound. Such suitable inorganic sulfur compounds include sulfides, alkali metal thiosulfates, alkaline earth metal thiosulfates, iron thiosulfates, alkali metal dithionites, and alkaline earth metal dithionites. These inorganic sulfur compounds react with soluble mercury in the deposits to convert it to insoluble mercury compounds. The process substantially inhibits the elution from the deposits of soluble mercury compounds with water. The process is described as useful for treating land areas, landfill deposits, or submarine sediment deposits to reduce the soluble mercury concentration. The patent describes the application of inorganic sulfur compounds to the deposits of mercury-containing materials by, for example, spreading or blowing inorganic sulfur compound on the surface of mercury-containing areas such as land areas, landfill deposits, the water covering submarine deposits with mercury-containing material or the land areas surrounding these water-covered sediments. The stabilizing agent can be carried into the deposits by water in the form of rainfall or water applied to those areas, for example, by spraying or irrigation. Preferred embodiments for surface application of mercury-containing material includes potassium sulfides, sodium thiosulfide, calcium thiosulfide, and sodium dithionite as inorganic sulfur compounds having a solubility in cold water of greater than 1 grams per liter. The patent describes that it is desirable to minimize the formation of mercury polysulfide complexes which can be eluted or leached from deposits in effluent which contain Hg concentrations higher than desired. It describes that mercury polysulfide formation may also be minimized or eliminated by the addition of polysulfide inhibitor such as inorganic sulfites and bisulfite compounds. In addition, at column 5, the patent describes that it is desirable to prevent or minimize the formation of hydrogen sulfide by limiting the amounts of hydrogen-containing sulfur compounds present as impurities in the inorganic sulfur compounds. In addition, hydrogen sulfide formation can also be minimized by limiting the exposure of the stabilizing inorganic sulfur compounds to air or sunlight. The examples describe the treatment of a mercury containing sludge by the surface application of various stabilizing agents. The Kaezur et al. patent does not, however, describe a method for stabilizing elemental mercury present in spent molecular sieve desiccants prior to their disposable in landfill, it does not even recognize the problem.

A process for the stabilization of mercury-containing waste is described in U.S. Pat. No. 4,844,815 to Ader et al. The process includes adding elemental sulfur and cement kiln dust to the waste/sludges in amounts effective to reduce the amount of leachable mercury to an environmentally acceptable level. Preferably, a strong base such as a strong caustic, e.g. sodium hydroxide, is also added to the waste with the sulfur and cement kiln dust. The types of wastes treated are described as sludge wastes generated from various industrial processes, in order to reduce the amount of leachable mercury in these wastes to below 20 ppb, described as ten times the drinking water standard. There is no description or suggestion in the Ader et al. patent of treating spent molecular sieves containing elemental mercury for their safe disposal.

The treatment of sorbants, such as molecular sieves, with sulfur containing compounds to improve the sorbants' ability to adsorb mercury is well known. For example, see U.S. Pat. Nos. 3,873,581; 4,233,274 (background); 4,474,896; 4,708,853; 4,786,483; 4,814,152; 4,834,953; 4,877,515; and 4,985,389. None of these patents, however, address the fixing of mercury in spent molecular sieve desiccants, to allow for safe disposal after their use. For example U.S. Pat. No. 4,786,483 to the inventor herein discloses a process for removing hydrogen sulfide and mercury from gases. The process utilizes porous granular sorbant material such as silica, alumina, silica-alumina, molecular sieves and mixtures of any of these materials. The sorbant material is impregnated with a chemical compound which is capable of converting mercury to the oxide form and simultaneously hydrogen sulfide to elemental sulfur. The reactive compound disclosed includes alkali metal peroxomonosulfate salt, e.g. potassium peroxomonosulfate salt ($KHSO_5$). Alternatively, the gas can be contacted directly with an aqueous solution of the chemical compound, such as alkali peroxomonosulfate salt. This patent, however, does not disclose a method for treating spent molecular sieve desiccants which contain elemental mercury so that they can be safely disposed.

U.S. Pat. No. 4,834,953 to the inventor herein, describes a process for removing residual mercury from treated natural gas by contacting the gas with an aqueous solution of alkali polysulfide, such as sodium polysulfide, and subsequently contacting the effluent gas with a cobalt salt on a suitable support such as calcium sulfate. The effluent gas can then be treated, as desired, to remove moisture and any other contaminants with an adsorbent. Copper sulfide may be present on various supports, such as activated carbon or molecular sieves. In addition, the prior art section describes a procedure where natural gas is contacted with a fixed bed of copper sulfide on an alumina-silica support to remove the mercury present in natural gas. Also, U.S. Pat. No. 4,877,515 and its sister patent U.S. Pat. No. 4,985,389 both to the inventor herein describe the use of polysulfide treated molecular sieves to remove mercury from gaseous or liquid hydrocarbon streams. The molecular sieve is pretreated with an aqueous solution of polysulfide and subsequently dried under conditions calculated to dry, but not decompose, the polysulfide present on the molecular sieve. The treated molecular sieve is then placed in contact with a stream of gaseous or liquid hydrocarbons. There is no description or suggestion in any of these patents of a method for fixing the elemental mercury present in the spent molecular sieves, allowing for their safe disposal.

Methods describing the removal of heavy metal pollutants from aqueous solutions and suspensions by precipitation are disclosed in U.S. Pat. Nos. 3,740,331; 3,790,370; 4,260,494; 4,333,913; 4,731,187 and 4,814,091. For example, U.S. Pat. No. 3,790,370 to Lalancette describes a process for removing metal ions, such as mercury and other metal ions, from polluted waters. Their process utilizes a sulfur-containing precipitating agent for diffusing with the contaminated water through peat. The process yields a water insoluble sulfide of the metal, which is adsorbed on the peat, allowing recovery of metal-free water. In the process, the metal oxide may be recovered by burning the metal sulfide-containing peat. The precipitating agents utilized may include sodium sulfide, ammonium polysulfide or sulfidrhyl bearing compounds of the formula R-SH where R is an alkyl phenyl, i.e. hexanethiol. None of these patents, however, describe or suggest the treatment of spent molecular sieves containing elemental mercury to allow for their safe disposal.

In summary, none of the related art provides a method for fixing elemental mercury in spent molecular sieve desiccants to allow for their safe disposal.

Accordingly, one purpose of the present invention is to provide a process for fixing elemental mercury in spent molecular sieve desiccants, to allow for the safe disposal without the danger of the mercury leaking out to the environment.

SUMMARY OF THE INVENTION

This and other purposes are achieved by the present invention, which provides a process for fixing elemental mercury (Hg°) in spent molecular sieve desiccants. The process includes isolating spent molecular sieve desiccant containing elemental mercury, and contacting the spent desiccant in a dilute aqueous solution of an alkaline metal salt. The reaction traps the mercury within the spent desiccant as a fixed heavy metal salt. The alkaline metal salt can include, for example, sodium thiosulfate ($Na_2S_2O_3$), sodium polysulfide ($Na_2S_x$), or potassium peroxomonosulfate ($KHSO_5$). The reaction with an aqueous solution of any of these salts acts to fix the elemental mercury (Hg°) as an insoluble mercury compound within the solid desiccant.

If an aqueous sodium thiosulfate or sodium polysulfide solution is utilized, then the process also includes introducing hydrochloric acid (HCl) in a suitable quantity to liberate sufficient elemental sulfur to react with the elemental mercury (Hg°) to form an HgS salt. The formation of HgS fixes the elemental mercury (Hg°) in the form of a heavy metal salt in the solid desiccant. If, however, an aqueous potassium peroxomonosulfate ($KHSO_5$) solution is utilized, then HCl is not needed. The aqueous potassium peroxomonosulfate solution is used in a suitable concentration to convert the elemental mercury (Hg°) in the spent desiccant to HgO. Accordingly, elemental mercury (Hg°) is fixed as an insoluble heavy metal oxide in the solid desiccant.

For a better understanding of the present invention, reference is made to the following description, taken in conjunction with accompanying equations, the scope of which is pointed out in the appended claims.

DETAILED DESCRIPTION OF THE PREFERRED EMBODIMENTS

A process for fixation of elemental mercury (HG°) in a spent molecular sieve desiccant is disclosed. The process allows for the safe disposal of the desiccant with the elemental mercury (Hg°) chemically fixed as an insoluble compound within the desiccant. In order to carry out the present invention, the quantity of elemental mercury (Hg°) present in the desiccant is first determined. This determination may be done utilizing conventional techniques well known to those of ordinary skill in the art. A dilute aqueous solution is then prepared, composed of either sodium thiosulfate ($Na_2S_2O_3$), potassium peroxomonosulfate ($KHSO_5$), or sodium polysulfide ($Na_2S_x$) in molar quantities sufficient for converting the elemental mercury (Hg°) in the spent desiccant molecular sieve to an insoluble mercury oxide or salt.

If an aqueous sodium thiosulfate ($Na_2S_2O_3$) solution is used, the necessary concentration for fixing the mercury is determined in accordance with equations 1 and 2, as follows:

$$Na_2S_2O_3 + 2HCl \xrightarrow{Aq} H_2SO_3 + S^* + 2NaCl \quad (1)$$

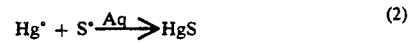
$$Hg^* + S^* \xrightarrow{Aq} HgS \quad (2)$$

The aqueous solution is then mixed with the spent desiccant containing the elemental mercury (Hg°). The treated spent desiccant is then mixed with a quantity of HCl sufficient to liberate elemental sulfur ("S°") in accordance with equation 1. The HgS salt is the reaction product of the elemental sulfur, generated by the action by HCl on $Na_2S_2O_3$, and elemental mercury (Hg°) present in the desiccant. Furthermore, since the elemental mercury (Hg°) is entrapped within the solid desiccant and the aqueous $Na_2S_2O_3$/HCl reaction occurs in the mixture of the aqueous/desiccant mixture, the HgS formed by the reaction "fixes" the elemental mercury (Hg°) in the form of an insoluble heavy metal salt in the solid desiccant.

If an aqueous sodium polysulfide (Na$_2$S$_x$) solution is utilized, then a most preferred concentration of the aqueous solution is about 100 ppm sodium polysulfide (Na$_2$S$_x$), which is mixed with the spent molecular sieve desiccant containing the elemental mercury (Hg°). The aqueous solution of sodium polysulfide may preferably range in concentration from about 10 to about 1,000 ppm sodium polysulfide. The mixture of the sodium polysulfide treated desiccant is then treated with a sufficient concentration of HCl to liberate elemental sulfur in accordance with equations 3 and 4.

$$Na_2S_x + HCl \xrightarrow{Aq} NaCl + H_2S_x \quad (3)$$

$$H_2S_x \xrightarrow{Aq} H_2S + (x-1)S° \quad (4)$$

These reactions provide sufficient elemental sulfur required to react with the elemental mercury (Hg°) in accordance with equation 2. In addition, the H$_2$S generated in accordance with equation 4, reacts with elemental mercury (Hg°) as follows:

$$H_2S + Hg° \xrightarrow{Aq} HgS + H_2 \quad (5)$$

As discussed above, the elemental mercury (Hg°) is entrapped within the desiccant and the aqueous reaction of sodium polysulfide and hydrochloric acid occurs in the aqueous/desiccant mixture. Thus, the HgS formed, according to Equation (5), fixes the elemental mercury (Hg°) in the form of an insoluble heavy metal salt within the solid molecular sieve desiccant.

If an aqueous potassium peroxomonosulfate (KHSO$_5$) solution is selected, then a dilute aqueous solution containing KHSO$_5$ is prepared by dissolving an amount of KHSO$_5$ sufficient to convert the elemental mercury (Hg°) in the spent desiccant to HgO, in accordance with equation (6):

$$KHSO_5 + Hg° \xrightarrow{Aq} KHSO_4 + HgO \quad (6)$$

The aqueous potassium sulfate solution is mixed well with the mercury containing spent molecular sieve desiccant. The potassium peroxomonosulfate in the aqueous solution allows the reagent to convert the elemental mercury (Hg°) directly to HgO. The reaction fixes the elemental mercury (Hg°) in the form of an insoluble heavy metal oxide (HgO) in the solid desiccant.

Each of these mercury conversion steps can be carried out separately, to fix the elemental mercury (Hg°) in the interior of the desiccant, depending on the availability and convenience of the particular reagents or processing apparatus. Other desiccants besides molecular sieves could advantageously be treated by the method of the present invention to fix elemental mercury absorbed by such desiccants. Additionally, these steps may be combined to sequentially convert any remaining trace amounts of mercury at various commercial, processing or disposal stages.

Thus, while I have described what are the presently contemplated preferred embodiments of the present invention, further changes and modifications could be made by those of ordinary skill in the art without departing from the spirit and scope with the invention and it is contemplated to claim all such changes and modifications.

I claim:

1. A process for fixing elemental mercury in a spent desiccant, comprising:
    isolating a solid desiccant containing elemental mercury;
    determining the quantity of elemental mercury present in the desiccant;
    contacting the desiccant in an aqueous mixture with molar quantities of an alkaline metal salt sufficient for converting the elemental mercury in the solid desiccant to a water insoluble oxide or salt, resulting in a wetted desiccant impregnated with the alkaline metal salt, said alkaline metal salt is selected from the group consisting of sodium thiosulfate, sodium polysulfide, potassium peroxomonosulfate, and combinations thereof,
    whereby said mercury is fixed as a water insoluble mercury oxide or salt compound in the solid desiccant.

2. A process as recited in claim 1, wherein said alkaline metal salt is selected from the group consisting of sodium thiosulfate and sodium polysulfide; and
    said process further comprising introducing hydrochloric acid to the wetted desiccant in a suitable quantity to liberate elemental sulfur, thereby releasing sufficient elemental sulfur to react with said elemental mercury to form HgS,
    whereby the elemental mercury in the solid desiccant is fixed within the desiccant as a water insoluble HgS.

3. A process as recited in claim 1, wherein said alkaline metal salt is potassium peroxomonosulfate in a suitable concentration to convert the elemental mercury in the solid desiccant to HgO,
    whereby said elemental mercury in the solid molecular sieve desiccant is fixed as water insoluble HgO.

4. A process as recited in claim 1, wherein the solid desiccant is a molecular sieve.

5. A process for fixing elemental mercury in a spent molecular sieve desiccant, comprising:
    isolating a molecular sieve desiccant containing elemental mercury;
    determining the quantity of elemental mercury present in the desiccant;
    contacting the molecular sieve desiccant in an aqueous mixture with molar quantity of an alkaline metal salt sufficient for converting the elemental mercury in the desiccant to a water insoluble oxide or salt, resulting in a wetted molecular sieve desiccant impregnated with the alkaline metal salt, said alkaline metal salt is selected from the group consisting of sodium thiosulfate, sodium polysulfide, potassium peroxomonosulfate, and combinations thereof,
    whereby said mercury is fixed as a water insoluble mercury oxide or salt compound in the molecular sieve desiccant.

6. A process as recited in claim 5, wherein said alkaline metal salt is selected from the group consisting of sodium thiosulfate and sodium polysulfide; and
    said process further comprising introducing hydrochloric acid to the wetted desiccant in a suitable quantity to liberate elemental sulfur, thereby releasing sufficient elemental sulfur to react with said elemental mercury to form HgS, whereby the elemental mercury in the spent molecular sieve desiccant is fixed within the desiccant as water insoluble HgS.

7. A process as recited in claim 5, wherein said alkaline metal salt is potassium peroxomonosulfate in a suitable concentration to convert the elemental mercury in the molecular sieve desiccant to HgO, whereby said elemental mercury in the spent molecular sieve desiccant is fixed as water insoluble HgO.

* * * * *